United States Patent [19]
Ashley

[11] 3,861,376
[45] Jan. 21, 1975

[54] IN-CYLINDER MIXERS FOR INTERNAL COMBUSTION ENGINES

[76] Inventor: Carlyle M. Ashley, 7320 Barberry Ln., Manlius, N.Y. 13104

[22] Filed: Nov. 19, 1973

[21] Appl. No.: 417,072

[52] U.S. Cl. ..... 123/191 R, 123/141 R, 123/188 M, 123/188 A
[51] Int. Cl. .................. F02b 23/00, F02m 29/00
[58] Field of Search ....... 123/188 M, 188 A, 141 R, 123/191 R

[56] References Cited
UNITED STATES PATENTS

| 508,042 | 11/1893 | Niemczyk | 123/191 R |
|---|---|---|---|
| 1,555,991 | 10/1925 | Konar | 123/191 R |
| 1,969,202 | 8/1934 | Bugaud | 123/141 |
| 2,384,681 | 9/1945 | Janes | 123/141 |
| 3,678,905 | 7/1972 | Diehl | 123/188 M |

FOREIGN PATENTS OR APPLICATIONS

| 45,018 | 2/1935 | France | 123/191 R |
|---|---|---|---|
| 812,026 | 1/1937 | France | 123/191 R |

Primary Examiner—Wendell E. Burns
Attorney, Agent, or Firm—Bruns & Jenney

[57] ABSTRACT

Improved in-cylinder mixer means for internal combustion engines. The use of a leaner mixture of fuel and air, or use of more recycled burned gas, to achieve a reduction in the nitrogen oxides exhausted by an internal combustion engine is made possible by reducing the cyclic variation of combustion pressure in the engine. Reduction in the cyclic variation is accomplished in the invention by improving the uniformity of the mixture and turbulence of the gases and vapor in the cylinders, and by increasing the initial rate of combustion. The mixing is improved by dividing the stream of intake gas leaving the intake valve into a series of jets and redirecting at least a portion of them axially of the cylinder to increase the induction of secondary gases already present in the cylinder chamber. Dividing the intake gas into a series of jets also operates to decrease the length and increase the uniformity of each jet and to eliminate vortices in the gas. The increase in combustion rate is accomplished by locating the spark gas adjacent projecting, matching surfaces on top of the piston and on the bottom of the cylinder head, which surfaces approach each other closely as the piston approaches top dead center and cause the burning gases to be propelled into the main volume of the combustion chamber.

10 Claims, 12 Drawing Figures

Patented Jan. 21, 1975

Patented Jan. 21, 1975

IN-CYLINDER MIXERS FOR INTERNAL COMBUSTION ENGINES

BACKGROUND OF THE INVENTION

This invention relates generally to internal combustion engines, and is particularly directed to novel in-cylinder mixer means for improving the performance of internal combustion engines for vehicles.

It is well known that the combustion of the fuel and air in engine cylinders can be made more complete by using a "lean" mixture, i.e., using excess air. Furthermore, the generation of nitrogen oxides can be minimized by reducing the temperature level at which combustion occurs, by the recirculation of cooled burned gases from previous combustion cycles and/or by the use of substantial proportions of excess air in the charge.

In present internal combustion engines, however, the amount of recycled gas or excess air that can be used is sharply limited by the lack of uniformity of the mixture and of the tubulence of the gases at the time of ignition and combustion. This lack of uniformity results in a variation of combustion rate and peak gas pressure between successive cycles in each cylinder (cyclic variation) which increases as the amount of recycled gas or excess air is increased, until unacceptable engine operation occurs.

By providing greater uniformity of the gases in the cylinders, including both those in the charge and the residual burned gases, the cyclic variation can be reduced and the amount of recycled gas and/or excess air increased to meet applicable emission standards. It should be recognized that other elements of the combustion control system can also contribute to this result. For example: good carburetion including good fuel vaporization, mixing and distribution; selective extraction of the recycled burned gas that is coolest and richest in hydrocarbons; and possibly an exhaust reactor to oxidize the carbon monoxide and hydrocarbons at high load conditions.

In a typical gasoline fueled automobile engine, the combustion behaves somewhat as though the charge is randomly "stratified." It has been determined that about one third of the cyclic variation of combustion is related to the variation of the incoming charge, another third to the variation of the mixture of the charge and the residual burned gases remaining from previous combustion cycles and the final third to variations of gas tubulence.

In a typical valve-in-head engine, the entering charge is turned through nearly a right angle just before passing through the intake valve. This causes a separation from the passage walls and poor distribution around the periphery of the valve. Since the valve is offset in the cylinder head, the effect of this poor distribution is to impart an axial swirl (vortex) to the entering mixture.

The change enters the cylinder from the intake valve as a conical stream which impinges first on the piston head and then on the cylinder wall before it can entrain any substantial amount of the residual gases already present in the cylinder chamber. Passing down the cylinder wall, the stream is deflected inwardly by the piston and then flows upwardly to form a toroidal vortex at the juncture of the cylinder wall and piston head. Contrary to popular belief, a vortex provides a means of stabilizing differences of density or composition rather than enhancing mixing. This may be readily seen in the familiar Smoke ring which maintains its form and serves as a medium of transport of the material for substantial distance and time.

The core of a vortex revolves as a solid body with very little mixing while the other portion has a tangential velocity relationship inverse as the square of the radius. Fluid of low density, such as the hot residual burned gas, tends to be trapped near the core of the vortex by the centrifugal separating force.

Because of friction with surrounding surfaces and the transport of fluid through the vortex in the cylinder, the vortex is short lived but not in relation to the short time of the compression stroke before ignition. Thus, there are trails of unmixed vortex remnants wich persist into the combustion part of the cycle. These can cause serious aberrations of the ignition and combustion process and are a major contributor to the cyclic variation.

The portion of the charge stream leaving the valve nearest the cylinder wall has an opportunity to entrain residual gases on one side of the stream only, whereas the portion of the stream leaving the opposite side of the valve will entrain gases on both sides, resulting in a substantial difference in mixing around the periphery. This, of course, can also have an adverse effect on the cyclic variation.

SUMMARY OF THE INVENTION

With the foregoing considerations in view, the present invention is directed to novel in-cylinder mixer means for improving the performance of internal combustion engines by ensuring a more uniform mixture of the charge and burned gases in the cylinders and additionally by increasing the initial rate of combustion.

The primary object of the invention is to make the mixture and tubulence of the gases in the engine cylinders more uniform at the time of ignition and combustion so as to permit operation of the engine with excess air and/or recycled burned gas whereby objectionable exhaust emissions are substantially reduced. Another important object is to counter the combustion retardation caused by the excess air and increased use of recycled gas, and to increase the rate of combustion during the initial stages. A further object is to reduce cyclic variation of the combustion rate and peak cylinder pressure at high excess air and/or recycle rates. Still another important object is to maintain good engine performance and fuel economy while increasing the excess air and/or recycled burned gas in the charge.

More specific objects of the invention are to decrease the resistance offered by the intake valve and eliminate the formation of axial vortices in the combustion space by improving the velocity distribution; to counter the combustion retarding effect of the excess air and/or recycled gas by gas transport of the buring gas; and to improve the combustion by achieving greater uniformity of the mixture throughout the gas volume.

More specifically, the in-cylinder mixers of the invention improve the uniformity of mixing and break up the vortices by dividing the stream leaving the intake valve into a plurality of separate streams or jets, and by redirecting a portion of the jets so that the total stream surface available for secondary entrainment will be radically increased. In so breaking down the usual conical stream pattern, there is an opportunity for continued mixing in each jet even after initial entrainment has been completed. The jets nearest the cylinder wall will be redirected across the cylinder to take advantage of the space under the valve and thereby ensure adequate entrainment length.

The effectively smaller individual streams or jets will have a higher than normal rate of deceleration due to the increased entrainment, and the formation of toroidal vortices will be prevented by the destruction of the overall conical stream pattern. The effect of these is to create a fluid volume of fine-grained, uniform turbulence and uniform composition.

In order to reduce the pressure loss through the intake valve, improve the flow distribution leaving the valve and eliminate the possibility of any axial swirl, it is contemplated that one or more turning vanes may be installed in the elbow ahead of the intake valve.

An effect of increasing the proportion of excess air and/or recycled burned gas is to slow down the rate of combustion. Likewise, decreasing the tubulence level can also reduce the combustion rate. This slower combustion can have an adverse effect on engine efficiency due to the work input on the up stroke and the generation of nitrogen oxides due to the longer period at high temperature. To counteract such effects, the invention contemplates providing for gas transport of the burning gases across the cylinder from the spark plug to accelerate the rate of combustion to a near optimum value.

As indicated hereinabove, the in-cylinder mixing means of the invention subdivides the charge stream leaving the intake valve into a plurality of jets for rapid induction of secondary gases. This is accomplished in the preferred embodiment of the invention by providing a deeply recessed intake valve surrounded by channels in the cylinder head which convert the gas leaving the intake valve into a series of jets directed so as to achieve the objectives described above. A modified form of the invention provides for a plurality of radially extending deflectors mounted on a downward extension of the intake valve itself to achieve the same objectives.

DESCRIPTION OF THE PREFERRED EMBODIMENTS

Figure 1:
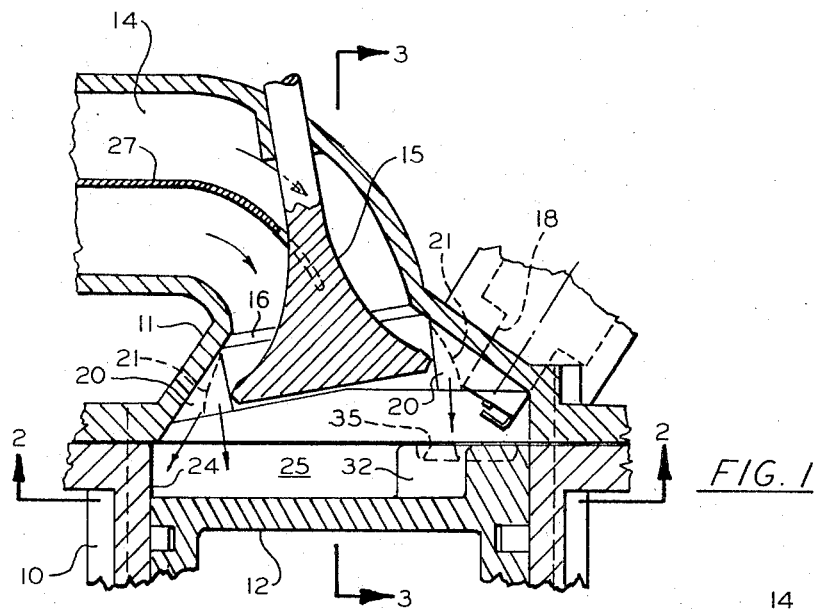
FIG. 1 is a fragmentary vertical section through the cylinder, piston and cylinder head of a valve-in-head engine embodying the invention, the section being taken substantially as indicated by line 1—1 of FIG. 2.
Figure 3:
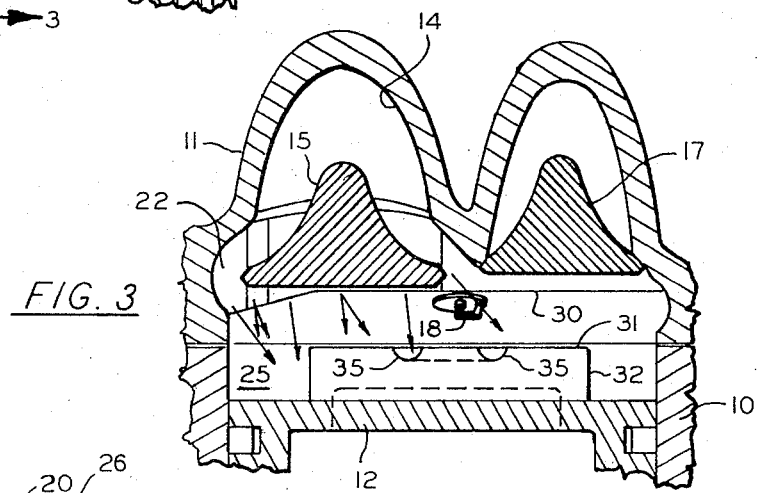
FIG. 3 is a vertical section taken substantially on line 3—3 of FIG. 1.

Having reference now to the drawings, and with particular reference to FIGS. 1-4, there is shown fragmentarily a cylinder-piston-cylinder head arrangement for an internal combustion engine particularly adapted for vehicular use. In this arrangement, the cylinder is indicated at 10, the cylinder head at 11 and the piston at 12. The cylinder head includes an intake passage 14 in which an intake valve 15 is reciprocably mounted in the usual manner, the passage having a seat 16 engageable by the valve to close the passage. The exhaust valve 17 is located next to the intake valve, FIGS. 2 and 3, and the spark plug 18 is located between and to one side of the valves as shown.

In accord with the invention, the intake valve seat 16 and the valve itself are deeply recessed in the cylinder head to provide space in the head for a plurality of channels 20, 21 and 22 disposed circumferentially in the head with respect to the intake valve. The channels are formed in the head to divide and selectively direct the fuel-air charge that is discharged from the intake passage 14. To this end, channels 20 are angled so as to direct streams or jets of the charge outwardly toward and along the interior wall 24 of the cylinder, channels 21 are angled to direct streams downwardly toward the piston substantially parallel to the cylinder wall, and channel 22 is angled to direct a stream inwardly down and across the chamber 25 under valve 15.

Figure 2:
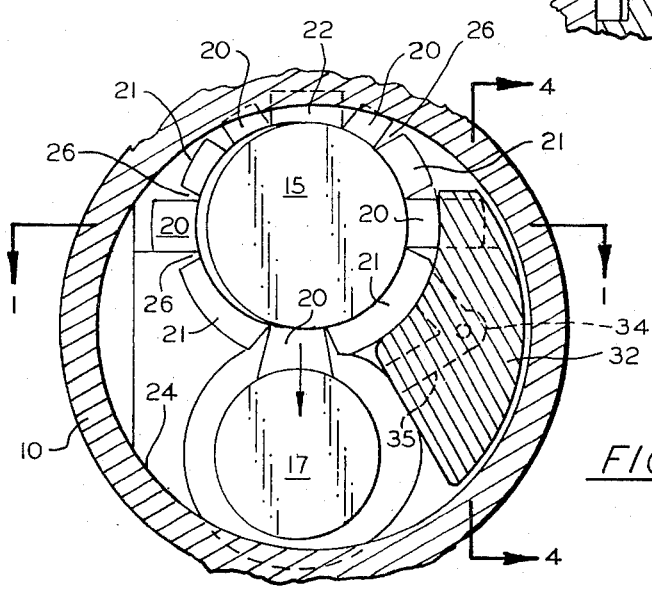
FIG. 2 is a horizontal section taken substantially on line 2—2 of FIG. 1.
Figure 4:
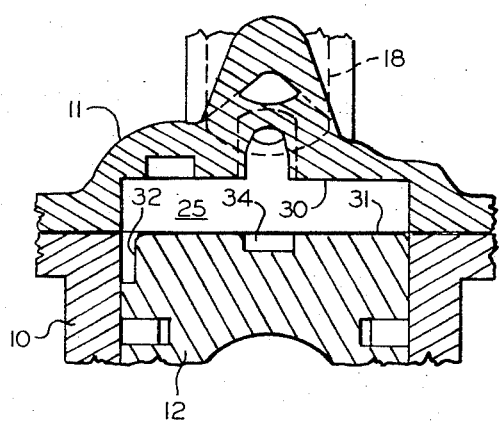
FIG. 4 is a vertical section taken substantially on line 4—4 of FIG. 2.

The channels 20, 21 and 22 break what would otherwise be a generally conical stream leaving the intake passage 14 into multiple streams or jets which will entrain and mix with other gases in the chamber 25 more rapidly than if the conical stream had not been disrupted. As best shown in FIG. 2, the channels are separated by lands 26 which increase the effectiveness of the channels in breaking up the stream.

The jets of gas leaving channels 20 impinge upon and spread out over the cylinder wall 24 in a thin film while the jets leaving channels 21 and 22 entrain other gases in the chamber 25 on all sides of the jets as they travel lengthwise through the chamber. In this manner, more of the gas already in the chamber is entrained and mixed than would be possible with a conventional conical stream. The small size of each jet pattern will not form vortices as with the overall pattern of a conventional conical stream.

It will, of course, be understood that the particular arrangement of channels that is shown in not critical and that other arrangements can be employed as long as a substantial portion of charge is directed so that it will not impinge on the cylinder wall, the charge stream is broken up sufficiently to present more entrainment surface to the gases already in the chamber, and a pattern conducive to large scale vortices is avoided.

Figure 8:
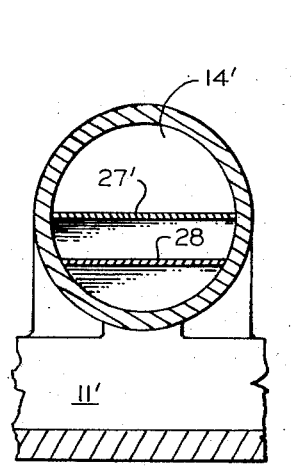
FIG. 8 is a vertical section taken substantially on line 8—8 of FIG. 5.

The velocity of the gas leaving the intake passage 14 can be made more uniform by utilizing a turning vane 27, FIG. 1, the vane being in the form of a strip that extends across the intake passage along the longitudinal center line thereof. The passage is thus divided into two passages with a more favorable turning radius. A further improvement can be effected through the use of a second turning vane 28, FIGS. 5 and 8, substantially parallel to the centerline vane 27' and located between it and the inside bend of the intake passage. These vanes have the effect of decreasing the pressure drop of the intake fluid and of providing a more uniform discharge stream from the intake passage whereby the danger of setting up a swirling vortex in the chamber 25 or 25' is avoided.

While the effect of channels 20, 21 and 22 is to achieve more uniform fluid mixture and more uniform turbulence in chamber 25 at the time of ignition, which in turn has a favorable effect on the cyclic variation of combustion, this construction also results in a decrease in the rate of combustion which may have an unfavorable effect. The combustion rate, however, can be increased by providing a flat surface 30, FIG. 4, on the inside surface of the cylinder head which surface is closely approached by a matching surface 31 on the piston 12 as the latter approaches top dead center.

The surface 31 is shown on a raised portion 32 of the piston but the raised portion could alternatively be on surface 30 of the cylinder. The spark plug 18 is located in relation to surface 30, 31 so that as the piston 12 (shown somewhat below top dead center in FIGS. 1 and 5) moves up toward top dead center and the spark ignites the gases, the burning gases will be transported transversely toward the main chamber 25 thereby substantially increasing the rate of travel of the initial flame front across the cylinder and chamber 25. The raised portion 32 of the piston may be formed with a depression 34 and channels 35, FIGS. 2, 3, 6 and 7, for containing and directing the burning gases most effectively between the surfaces 30, 31. As indicated, the depression 34 is located below the electrodes of the spark plug 18. The structure just described cooperates with the mixing means previously described even when using a lean mixture of fuel and air or a substantial proportion of recycled burned gas.

FIGS. 5–9C illustrate a modified form of the invention wherein, instead of having channels 20, 21 and 22 formed in the cylinder head, deflectors or vanes 36 extend radially outwardly from the lower portion of the intake valve 15' for the same purpose. The deflectors 36 direct portions of the charge outwardly and downwardly along the walls of the cylinder 10' while other portions of the charge pass between the deflections and continue almost straight down or even slightly inwardly due to the lower extension of the valve 15' between the deflectors.

Figure 9:
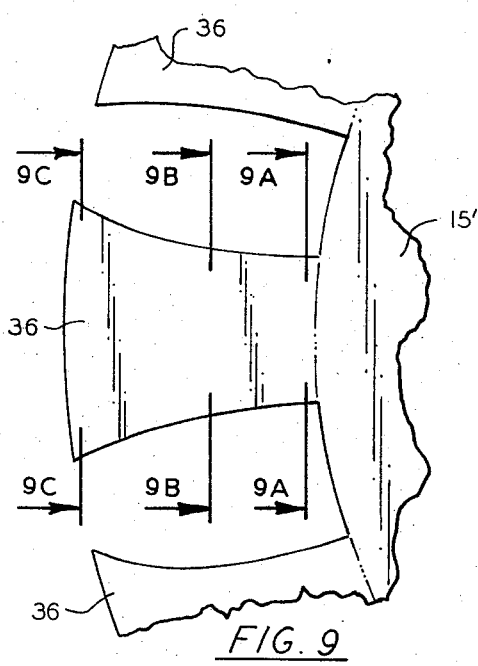
FIG. 9 is a greatly enlarged top plan view of one of the deflectors on the intake valve of FIGS. 5, 6 and 7.
Figure 9C:
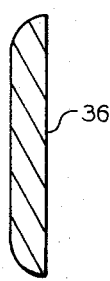
FIGS. 9A, 9B and 9C are vertical sections through the deflector taken on lines 9A—9A, 9B—9B and 9C—9C of FIG. 9, respectively.
Figure 9B:
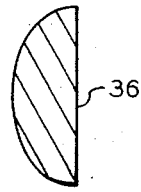
Figure 9A:
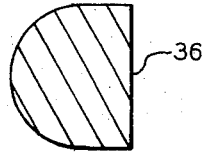

FIGS. 9–9C illustrate in detail the shape of the deflectors 36. From these, it may be seen that the inner end of each deflector is narow and rounded on the gas entering side, the middle of the deflector is wider and flatter, and the outer end is still wider and flatter thus providing a turning force to squeeze the gas between the deflectors downward. On the side of the intake valve nearest the inside surface of the cylinder head 11', the head is recessed as at 37, FIG. 7, to accommodate the deflectors, and the lowest portion of the head is curved inward as at 38 to redirect gases in that area across and down chamber 25'.

Figure 5:
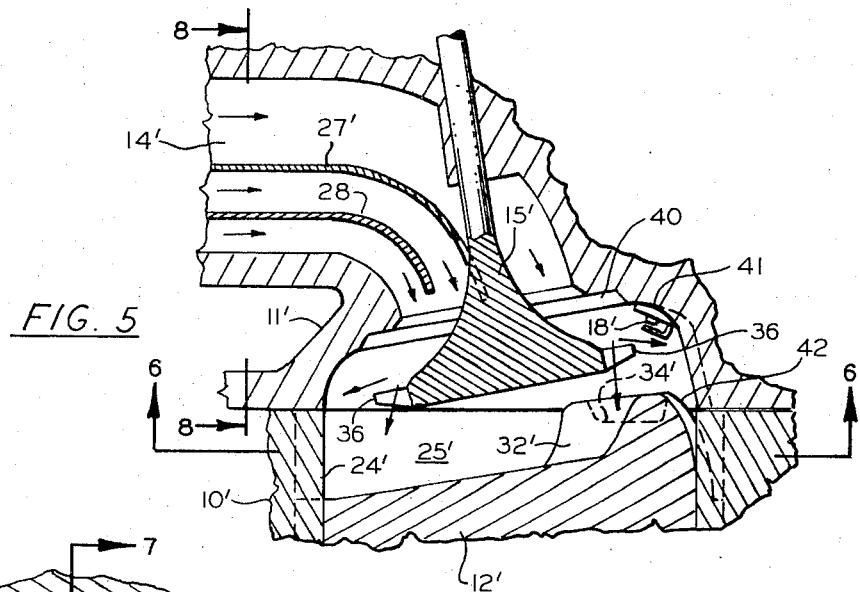
FIGS. 5, 6 and 7 are sections corresponding to FIGS. 1, 2 and 3, but showing a modified form of the invention.
Figure 6:
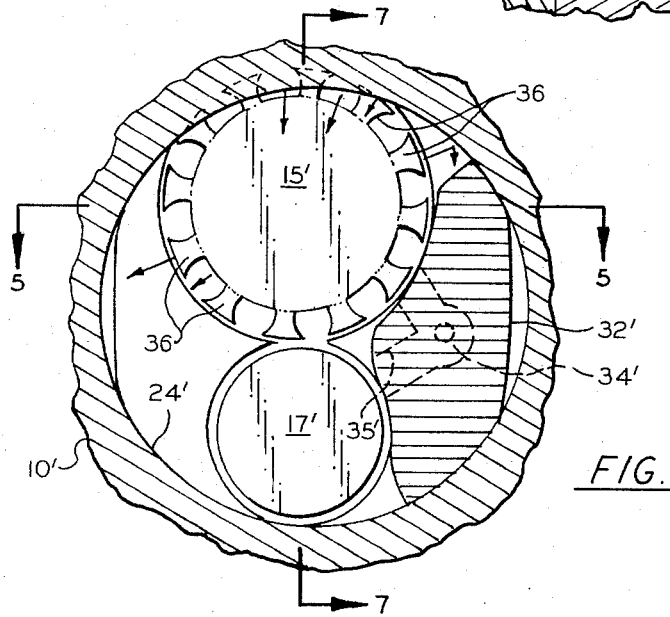
Figure 7:
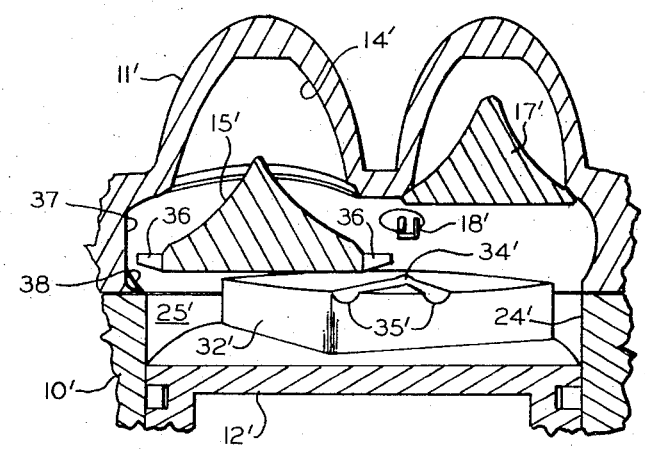

To accommodate the deflectors 36 when the intake valve 15' is in closed position, an annular recess or shoulder 40, FIG. 5, is formed in the cylinder head 11' below the valve seat 16'. In the embodiment of FIGS. 5–7, the inner surface 41 of the cylinder head, FIG. 5, may be slightly rounded, being shaped to match the surface 42 on the piston 12' for the purpose previously described in connection with cylinder head and piston surfaces 30, 31, FIG. 4.

From the foregoing description it will be apparent that the invention provides novel and highly effective in-cylinder mixers for internal combustion engines. As will be understood by those familiar with the art, the invention may be embodied in other specific forms without departing from the spirit or essential characteristics thereof.

I claim:

1. In an internal combustion engine including a cylinder head defining a chamber, an intake passage communicating with the chamber, and an intake valve for controlling the passage of vaporized fuel and gases through the intake passage; means for mixing the vaporized fuel, air and previously burned gases uniformly prior to combustion, said last-named means comprising means for dividing the intake fuel and air stream leaving the intake valve into at least several streams and directing at least a substantial portion of said streams along the chamber to avoid impingement of the centers of the streams on the chamber side wall and to avoid the formation of a toroidal vortex in the chamber.

2. In an internal combustion engine including a cylinder and cylinder head defining a chamber, an intake passage communicating with the chamber, and an intake valve for controlling the passage of vaporized fuel and air through the intake passage; improved in-cylinder mixing structure comprising means located adjacent the intake valve for dividing the vaporized fuel and gases stream leaving the intake valve into at least four streams and directing adjacent streams in substantially different directions.

3. In-cylinder mixing structure as defined in claim 2 wherein said means to divide the fuel and gases stream leaving the intake passage comprises a plurality of channels in said cylinder head adjacent the circumference of the intake valve.

4. In-cylinder mixing structure as defined in claim 3 wherein said channels cooperate with the intake valve to direct a portion of the fuel and gases stream leaving the intake passage along the chamber so as not to impinge upon the chamber wall and to direct another portion of the stream diagonally across the chamber.

5. In-cylinder mixing structure as defined in claim 3 wherein said channels are circumferentially disposed with respect to the intake valve and spaced radially outwardly therefrom.

6. In an internal combustion engine including a cylinder and cylinder head defining a chamber, an intake passage communicating with the chamber, and an intake valve for controlling the passage of vaporized fuel and air through the intake passage; improved in-cylinder mixing structure comprising means located adjacent the intake valve for dividing the vaporized fuel and gases stream leaving the intake valve into a plurality of streams and redirecting at least a portion of the streams, said last-named means comprising a plurality of channels in said cylinder head circumferentially disposed with respect to the intake valve and spaced radially outwardly therefrom, said channels including a first set arranged to direct a portion of the fuel and gases stream leaving the intake passage along the chamber so as not to impinge upon the chamber wall and a second set arranged to direct another portion of the stream diagonally across the chamber, the channels of said first and second sets being mingled with one another in their circumferential arrangement.

7. In-cylinder mixing structure as defined in claim 6 wherein said channels are separated from one another by lands.

8. In an internal combustion engine including a cylinder and cylinder head defining a chamber, an intake passage communicating with the chamber, and an intake valve for controlling the passage of vaporized fuel and air through the intake passage; improved in-cylinder mixing structure comprising means located adjacent the intake valve for dividing the vaporized fuel and gases stream leaving the intake valve into a plurality of streams and redirecting at least a portion of the streams, said last-named means comprising a plurality of circumferentially spaced deflector members projecting radially outwardly from the intake valve below its seating surface, said deflector members cooperating with the lower portion of the intake valve to direct a portion of the fuel and gases stream leaving the intake passage along the chamber so as not to impinge upon the chamber wall and to direct another portion of the stream diagonally across the chamber.

9. In an internal combustion engine having stationary and moving elements defining a chamber, an intake passage communicating with the chamber, means for controlling the intake of vaporized fuel and gases from the passage to the chamber; means for mixing the incoming vapor and gases and the retained burned gas from previous combustion cycles, comprising means for dividing the incoming stream into at least several jets and for directing at least a portion of these jets along the chamber so that the combined tangential component of the jets is small enough to prevent the formation of an axial vortex in the chamber.

10. In an internal combustion engine including a cylinder and cylinder head defining a combustion chamber, an intake passage having an elbow turn communicating with the chamber, and an intake valve for controlling the passage of vaporized fuel and gases through the intake passage; means for preventing the formation of an axial vortex in the chamber due to uneven velocity distribution of the fuel and gases stream leaving the intake passage comprising at least one transverse turning vane in the intake passage ahead of the intake valve, the line of development of the vane being parallel to the centerline of the turn of the elbow.

* * * * *